United States Patent
Joachim et al.

(10) Patent No.: US 9,958,256 B2
(45) Date of Patent: May 1, 2018

(54) SYSTEM AND METHOD FOR DIGITALLY SCANNING AN OBJECT IN THREE DIMENSIONS

(71) Applicants: Jason Joachim, Houston, TX (US); Jeremy Joachim, Austin, TX (US); Michael Glombicki, Houston, TX (US); Shai Bernstein, Decatur, GA (US); Todd Richard Goodall, Austin, TX (US)

(72) Inventors: Jason Joachim, Houston, TX (US); Jeremy Joachim, Austin, TX (US); Michael Glombicki, Houston, TX (US); Shai Bernstein, Decatur, GA (US); Todd Richard Goodall, Austin, TX (US)

( * ) Notice: Subject to any disclaimer, the term of this patent is extended or adjusted under 35 U.S.C. 154(b) by 0 days. days.

(21) Appl. No.: 14/625,783

(22) Filed: Feb. 19, 2015

(65) Prior Publication Data
US 2016/0245640 A1 Aug. 25, 2016

(51) Int. Cl.
*G01B 11/24* (2006.01)
*G01B 11/02* (2006.01)
*H04L 29/08* (2006.01)
*G06F 17/30* (2006.01)
(Continued)

(52) U.S. Cl.
CPC .......... *G01B 11/024* (2013.01); *G01B 11/24* (2013.01); *G01B 21/042* (2013.01); *G06F 17/30905* (2013.01); *H04L 67/02* (2013.01); *H04N 1/00827* (2013.01)

(58) Field of Classification Search
CPC . G01B 11/024; G06F 17/30905; H04L 67/02; G06T 17/00
See application file for complete search history.

(56) References Cited

U.S. PATENT DOCUMENTS

| 6,115,114 A | 9/2000 | Berg et al. |
| 6,328,215 B1 | 12/2001 | Dickson et al. |
| 6,474,556 B2 | 11/2002 | Dickson et al. |

(Continued)

FOREIGN PATENT DOCUMENTS

WO WO 2010/045391 * 4/2010 ............. B66F 9/075

OTHER PUBLICATIONS

Postea Group Inc.; 2015; QubeVu LTL. Oversize Freight, sub-second dims; 2 pgs.

*Primary Examiner* — Kara E Geisel
*Assistant Examiner* — Maurice Smith
(74) *Attorney, Agent, or Firm* — Maier & Maier, PLLC

(57) ABSTRACT

A system to digitally scan an object in three dimensions is disclosed. The system includes a server system, a memory system, a website and a scanner that scans an object and transfers any number of scanner data to the memory system, the scanner data resides on the digitally scan an object in three dimensions non-transitory storage media and includes any number of object dimensions such as length, width and height of the object, a three-dimensional object file and any number of raw video or any number of images of the object. The system includes a corresponding method for digitally scanning an object in three dimensions and a non-transitory computer storage media having instructions stored thereon which, when executed, execute the method for digitally scanning an object in three dimensions.

18 Claims, 12 Drawing Sheets

(51) Int. Cl.
*H04N 1/00* (2006.01)
*G01B 21/04* (2006.01)

(56) References Cited

U.S. PATENT DOCUMENTS

| | | | |
|---|---|---|---|
| 6,561,424 | B1 | 5/2003 | Dickson et al. |
| 6,611,617 | B1* | 8/2003 | Crampton .......... G01B 11/2518 |
| | | | 356/614 |
| 6,629,640 | B2 | 10/2003 | Dorris et al. |
| 6,739,511 | B2 | 5/2004 | Tsikos et al. |
| 6,837,432 | B2 | 1/2005 | Tsikos et al. |
| 6,948,659 | B2 | 9/2005 | Tsikos et al. |
| 6,969,001 | B2 | 11/2005 | Tsikos et al. |
| 7,055,745 | B2 | 6/2006 | Dorris et al. |
| 7,090,133 | B2 | 8/2006 | Zhu |
| 7,685,953 | B2 | 3/2010 | Giles |
| 2006/0106742 | A1* | 5/2006 | Bochicchio .......... G01G 19/083 |
| | | | 705/414 |
| 2008/0143997 | A1* | 6/2008 | Greenberg ............. G01B 11/00 |
| | | | 356/4.01 |
| 2008/0202402 | A1 | 8/2008 | Giles |
| 2008/0213073 | A1 | 9/2008 | Benedict et al. |
| 2009/0063415 | A1* | 3/2009 | Chatfield ................ G06F 9/542 |
| 2010/0091094 | A1* | 4/2010 | Sekowski ............. B66F 9/0755 |
| | | | 348/50 |
| 2011/0286007 | A1* | 11/2011 | Pangrazio ............. G01B 11/00 |
| | | | 356/614 |
| 2013/0271461 | A1* | 10/2013 | Baker .................... G06T 15/50 |
| | | | 345/420 |
| 2013/0293539 | A1* | 11/2013 | Hunt ..................... G01B 11/00 |
| | | | 345/420 |
| 2013/0342353 | A1* | 12/2013 | Choi ................. G06K 7/10366 |
| | | | 340/686.1 |
| 2014/0071430 | A1* | 3/2014 | Hansen ................ B66F 9/0755 |
| | | | 356/4.01 |
| 2016/0101936 | A1* | 4/2016 | Chamberlin ......... G05B 19/402 |
| | | | 700/214 |

* cited by examiner

SYSTEM AND METHOD FOR DIGITALLY SCANNING AN OBJECT IN THREE DIMENSIONS

BACKGROUND

Warehousing and shipping companies currently measure incoming cargo to determine the most efficient way to pack cargo for transport. In lieu of increasing insurance premiums, these companies also have a need to document the condition of inbound cargo before accepting it into their facility. Currently, this measuring and documentation is done manually by workers who physically measure the cargo and take pictures of it. Since the nature of warehousing is storage space, the sheer size and scope of these facilities and operations makes this process time consuming, physically demanding on employees, and expensive in overhead costs. Adding visual documentation via photos and video to this process further complicates this issue.

Accuracy is the key in this process. A seagoing container has a set dimension that freight has to be consolidated into. A half-inch discrepancy across approximately 40 pallets worth of freight loaded into one container can lead to an approximate 20 inch overage of freight that won't fit in the container. Weight is also a key element of loading these containers. Bridge laws and state highway regulation only permit so many pounds per axle as well as an overall gross weight of container, chassis, truck, driver, and freight. Currently this problem grows as highway regulation comes under more scrutiny and increases every year.

SUMMARY

In one exemplary embodiment, a system to digitally scan an object in three dimensions includes a server system with a processor system, a memory system with an operating system, a non-transitory storage media allowing for digitally storing a scanned object in three dimensions and a scanner that scans an object and transfers any number of scanner data to the memory system, the scanner data resides on the digitally scan an object in three dimensions non-transitory storage media and includes any number of object dimensions such as length, width and height of the object, a three-dimensional object file and any number of raw video or any number of images of the object. The system also includes a website having any number of web pages to digitally scan an object in three dimensions, the web pages having access to the digitally scan an object in three dimensions non-transitory storage media.

In some exemplary embodiments, a method for digitally scanning an object in three dimensions includes the steps of collecting any number of sensor data from a digital scanner, creating a three-dimensional model and performing any number of packing calculations from the collected scanned object data, creating any number of data files from the collected sensor data, the data files include object dimensions such as length, width, height and weight of the object, a three-dimensional object file and any number of raw video or any number of images of the object, transmitting the created data files to an object database of a server system and transmitting the created data files to a website, the transmitting includes allowing a user access to the created data files on the object database from the website.

In still further exemplary embodiments, a non-transitory computer storage media having instructions stored thereon which, when executed, execute a method for digitally scanning an object in three dimensions includes the steps of collecting any number of sensor data from a digital scanner, creating a three-dimensional model and performing any number of packing calculations from the collected scanned object data, creating any number of data files from the collected sensor data, the data files include object dimensions such as length, width and height of the object, a three-dimensional object file and any number of raw video or any number of images of the object, transmitting the created data files to an object database of a server system and transmitting the created data files to a website, the transmitting includes allowing a user access to the created data files on the object database from the website.

BRIEF DESCRIPTION OF THE DRAWINGS

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the present invention are disclosed in the following description and related figures directed to specific embodiments of the present invention. Those skilled in the art will recognize that alternate embodiments may be devised without departing from the spirit or the scope of the claims. Additionally, well-known elements of exemplary embodiments of the present invention will not be described in detail or will be omitted so as not to obscure the relevant details of the present invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the present invention", "embodiments" or "present invention" do not require that all embodiments of the present invention include the discussed feature, advantage, or mode of operation.

Figure 1:
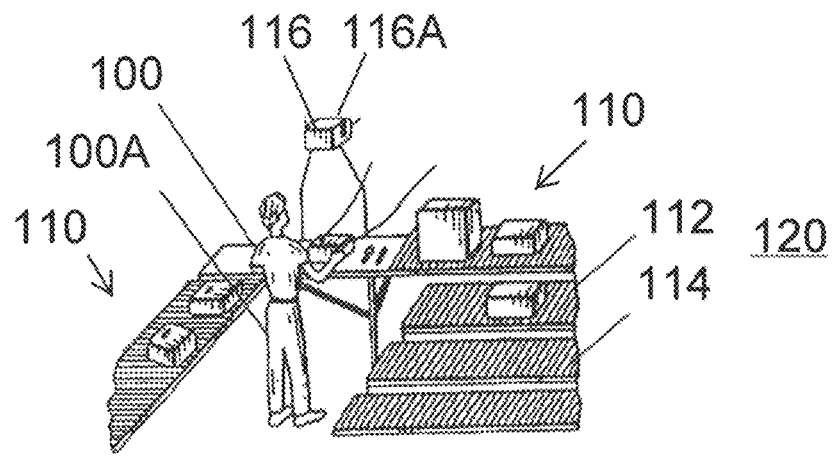
FIG. 1 illustrates an exemplary diagram showing a warehouse worker scanning any number of objects or cargo in a warehouse.

FIG. 1 illustrates an exemplary diagram showing a warehouse worker 100 sorting any number of objects or cargo 110 in a warehouse 120.

Still referring to exemplary FIG. 1, the warehouse worker 100 may be a shipping worker 100A and the like. The objects or cargo 110 may be placed on a conveyor belt 112, any number of roller tables 114 and the like and be transferred to the warehouse worker 100. The warehouse worker 100 may stand in front of a scanner 116 to scan the objects or cargo 110 that may be transferred to the warehouse worker 100 on the conveyor belt 112 or the roller tables 114. The scanner 116 illustrated in FIG. 1 is an overhead scanner 116A that acquires the dimensions of the objects or cargo 110 such as the length, width and height of the objects or cargo 110 after the warehouse worker 100 places the objects or cargo 110 underneath the overhead scanner 116A to be scanned.

Figure 2:
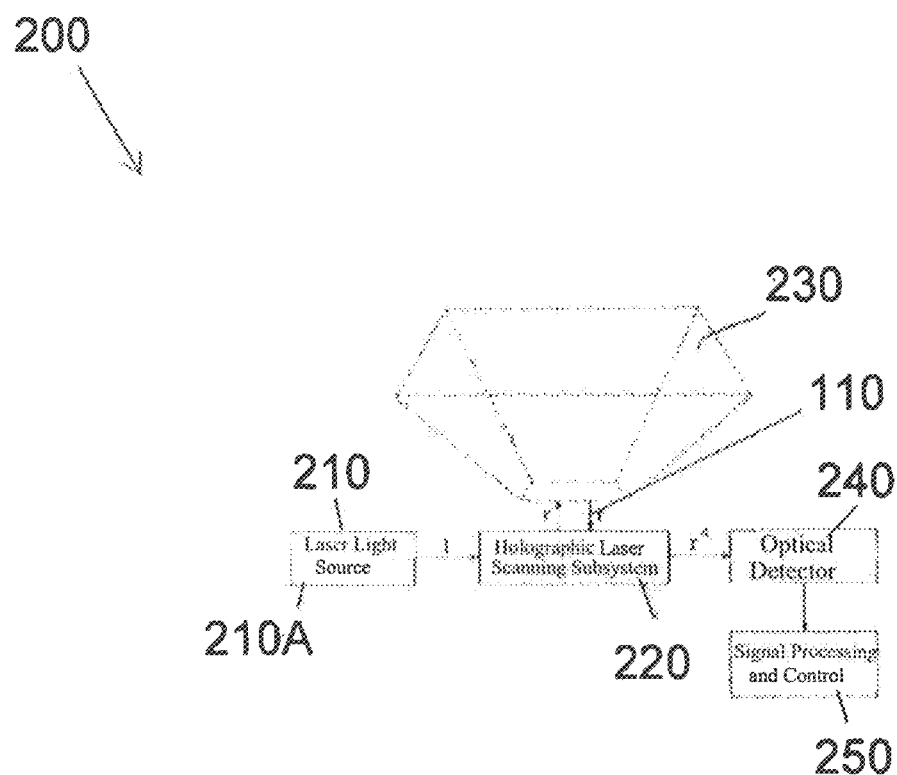
FIG. 2 illustrates an exemplary diagram of a digital scanning system to digitally scan an object or cargo in three dimensions.

FIG. 2 illustrates an exemplary diagram of a digital scanning system 200 to digitally scan an object or cargo in three dimensions.

In exemplary FIG. 2, the digital scanning system 200 may include a laser light source 210, a scanning system 220, a scanning region 230, an optical detector 240 and a signal processing and control system 250. The laser light source 210 may be a holographic laser light source 210A and the like. The scanning system 220 may receive the laser light source 210 and may scan the objects or cargo 110. The scanning system 220 may acquire the dimensions of the objects or cargo 110 being scanned such as the length, width and height of the objects or cargo 110. The scanning region 230 may be an area where the objects or cargo 110 may be scanned by the scanning system 220. The optical detector 240 may be integral to the scanning system 220 to detect the objects or cargo 110 underneath the scanning region 230. The signal processing and control system 250 may be integral to the scanning system 220 to process and control a signal generated by the optical detector 240.

Figure 3:
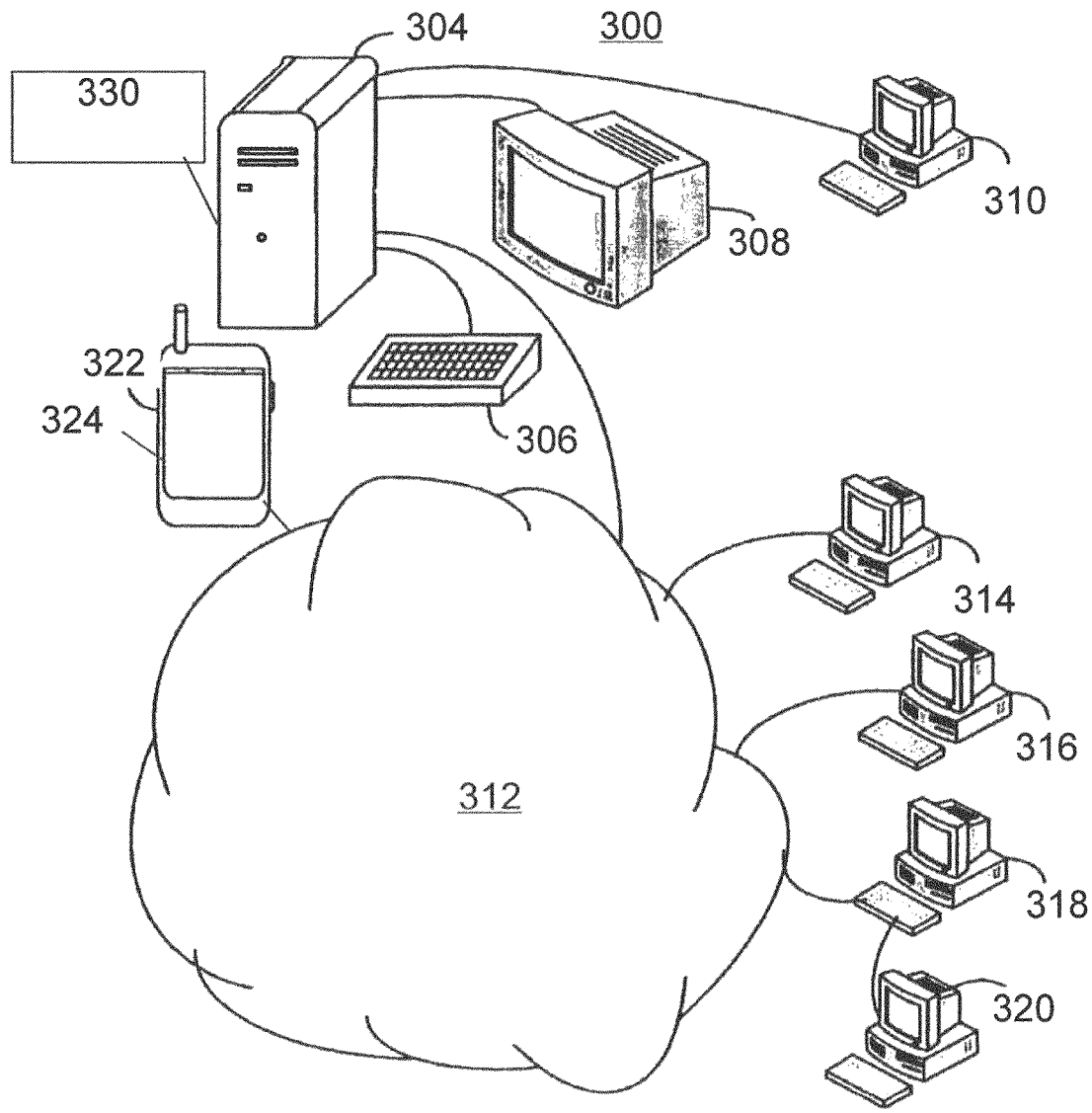
FIG. 3 illustrates an exemplary diagram showing a system to digitally scan an object in three dimensions.

FIG. 3 illustrates a system overview of a system 300 to digitally scan an object in three dimensions.

The system 300 may include a server system 304, an input system 306, an output system 308, any number of client systems 310, 314, 316, 318 and 320, a communications network 312, a handheld or mobile device 322 and a scanner 330. In other embodiments, the system 300 may include additional components and/or may not include all of the components listed above.

The server system 304 may include one or more servers. One server system 304 may be the property of the distributor of any related software. In other embodiments, the system 300 may include additional components and/or may not include all of the components listed above.

The input system 306 may be utilized for entering input into the server system 304, and may include any one of, some of, any combination of, or all of a keyboard system, a mouse system, a track ball system, a track pad system, any number of buttons on a handheld system, a mobile system, a scanner system, a wireless receiver, a microphone system, a connection to a sound system, and/or a connection and/or an interface system to a computer system, an intranet, and/or the Internet (i.e., infrared data association protocol or IrDA, universal serial bus or USB and the like).

The output system 308 may be utilized for receiving output from the server system 304, and may include any one of, some of, any combination of or all of a monitor system, a wireless transmitter, a handheld display system, a mobile display system, a printer system, a speaker system, a connection or an interface system to a sound system, an interface system to one or more peripheral devices and/or a connection and/or an interface system to a computer system, an intranet, and/or the Internet.

The system 300 illustrates some of the variations of the manners of connecting to the server system 304, which may be an information providing website (not shown). The server system 304 may be directly connected and/or wirelessly connected to the plurality of client systems 310, 314, 316, 318 and 320 and may be connected via the communications network 312. Client systems 320 may be connected to the server system 304 via the client system 318. The communications network 312 can include, but are not limited to, any one of, or any combination of, one or more local area networks or LANs, wide area networks or WANs, wireless networks, telephone networks, the Internet and/or other networks. The communications network 312 may include one or more wireless portals. The client systems 310, 314, 316, 318 and 320 may be any system that an end user may utilize to access the server system 304. For example, the client systems 310, 314, 316, 318 and 320 may be personal computers, workstations, laptop computers, game consoles, handheld network enabled audio/video players, mobile devices, a computerized watch or smart watch, an optical head-mounted display, Google Glass and/or any other smart or network appliance.

The client system 320 may access the server system 304 via the combination of the communications network 312 and another system, which in this example may be the client system 318. The client system 320 may be a handheld or mobile device 322, such as a mobile phone or a handheld network enabled audio/music player, which may also be utilized for accessing network content. The client system 320 may be a cell phone with an operating system or smart phone 324 and the like.

The scanner 330 may scan an object and can transfer any amount of scanner data to the memory system. The scanner data may reside on the digitally scan an object in three dimensions non-transitory storage media and can include any number of object dimensions such as length, width and height of the object, a three-dimensional object file and any number of raw video or any number of images of the object.

Figure 4A:
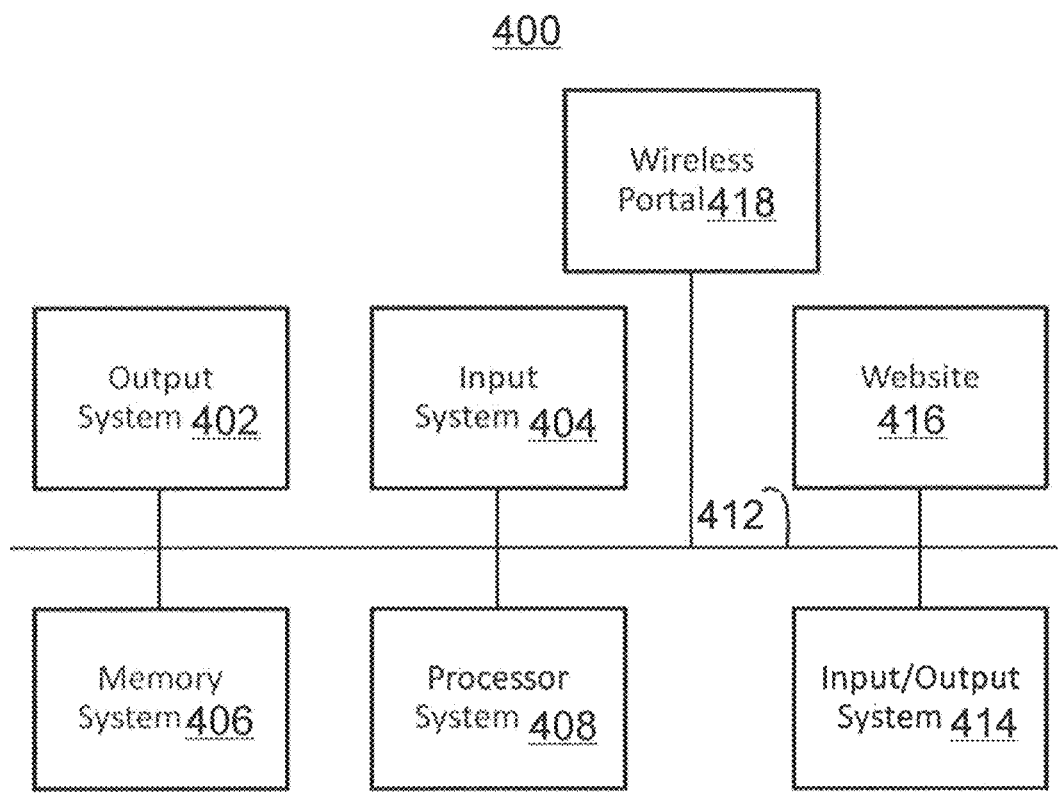
FIG. 4A illustrates an exemplary block diagram of a client system.

FIG. 4A illustrates a block diagram of a client system 400 that may be utilized as one of the system units to digitally scan an object in three dimensions. The client system 400 may include an output system 402, an input system 404, a memory system 406, a processor system 408, a communications system 412, an input/output system 414, a website 416 and a wireless portal 418. Other embodiments of the client system 400 may not have all of the components and/or may have other embodiments in addition to or instead of the components listed above.

The client system 400 can include, but is not limited to, the client systems 310, 314, 316, 318, 320, and/or handheld or mobile device 322 or smartphone 324 that may be utilized as one of the network devices of FIG. 3. In other embodiments, the client system 400 may include additional components and/or may not include all of the components listed above. The output system 402 may include any one of, some of, any combination of or all of a monitor system, a wireless transmitter, a handheld display system, a printer system, a speaker system, a connection or interface system to a sound system, an interface system to peripheral devices and/or a connection and/or an interface system to a computer system, an intranet, and/or the Internet.

The input system 404 may include any one of, some of, any combination of or all of a keyboard system, a mouse system, a track ball system, a track pad system, one or more buttons on a handheld system, a scanner system, a wireless receiver, a microphone system, a connection to a sound system, and/or a connection and/or an interface system to a computer system, an intranet, and/or the Internet (i.e., IrDA, USB).

The memory system 406 may include, any one of, some of, any combination of or all of a long term storage system, such as a hard drive, a short term storage system, such as a random access memory; a removable storage system, such as a floppy drive or a removable drive, and/or a flash memory. The memory system 406 may include one or more machine readable mediums that may store a variety of different types of information. The term machine readable medium may be utilized to refer to any medium that may be structurally configured for carrying information in a format that may be readable by a machine. One example of a machine-readable medium may be a computer-readable medium. The memory system 406 may store a non-transitory storage media to digitally scan an object in three dimensions.

The processor system 408 may include any one of, some of, any combination of, or all of multiple parallel processors, a single processor, a system of processors having one or more central processors and/or one or more specialized processors dedicated to specific tasks. The processor system 408 may implement the programs stored in the memory system 406. The communications system 412 may communicatively link the output system 402, the input system 404, the memory system 406, the processor system 408, and/or the input/output system 414 to each other. The communications system 412 may include any one of, some of, any combination of, or all of one or more electrical cables, fiber optic cables, and/or capabilities of sending signals through air or water (e.g. wireless communications), and the like. Some examples of capabilities of sending signals through air and/or water may include systems for transmitting electromagnetic waves such as infrared and/or radio waves and/or systems for sending sound waves.

The input/output system 414 may include devices that have the dual function as input and output devices. For example, the input/output system 414 may include one or more touch sensitive screens, which display an image and therefore may be an output device and accept input when the screens may be pressed by a finger or a stylus. The touch sensitive screens may be sensitive to heat, capacitance and/or pressure. One or more of the input/output devices may be sensitive to a voltage or a current produced by a stylus. The input/output system 414 is optional, and may be utilized in addition to or in place of the output system 402 and/or the input device 404.

The client systems 310, 314, 316, 318, 320 and the handheld or mobile device 322 may also be tied into a website 416 or a wireless portal 418 which may also be tied directly into the communications system 412. Any website 416 or wireless portal 418 may also include a non-transitory storage media and a website module to maintain, allow access to and run the website as well. The website 416 may have any number of web pages to digitally scan an object in three dimensions, the web pages having access to the digitally scan an object in three dimensions non-transitory storage media.

Figure 4B:
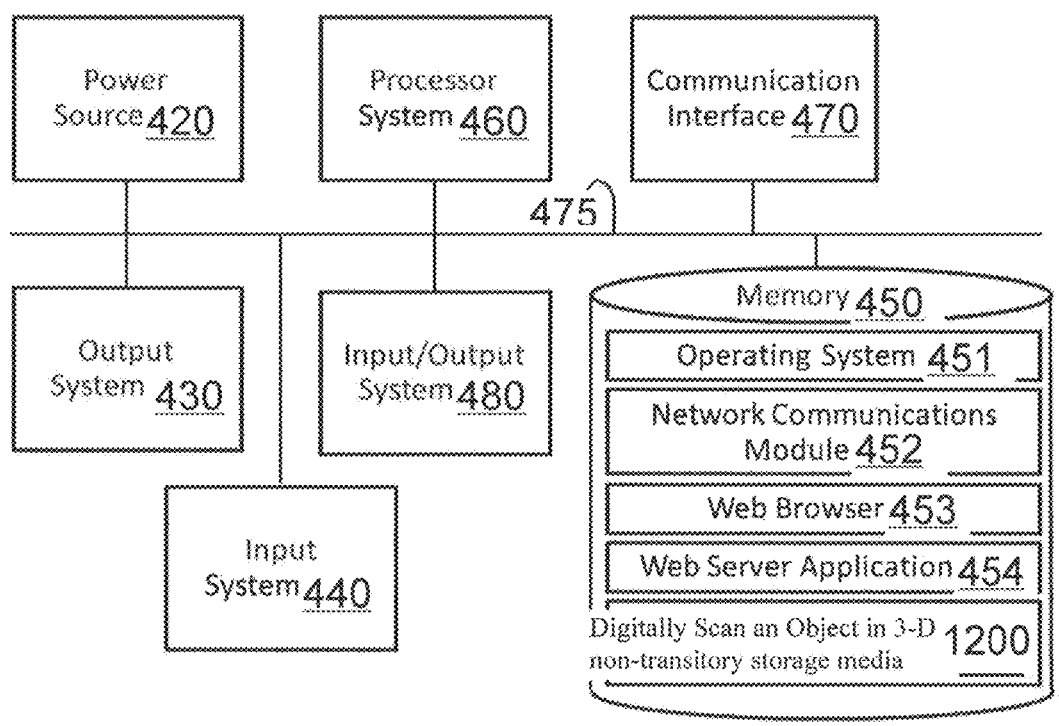
FIG. 4B illustrates an exemplary block diagram of a server system.

FIG. 4B illustrates a block diagram of a server system 304 that may be utilized to digitally scan an object in three dimensions. The server system 304 may include a power source 420, an output system 430, an input system 440, a memory system 450, which may store an operating system 451, a communications module 452, a web browser module 453, a web server application 454 and a digitally scan an object in three dimensions non-transitory storage media 1200. The server system 304 may also include a processor system 460, a communications interface 470, a communications system 475 and an input/output system 480. In other embodiments, the server system 304 may include additional components and/or may not include all of the components listed above.

The output system 430 may include any one of, some of, any combination of, or all of a monitor system, a handheld display system, a printer system, a speaker system, a connection or interface system to a sound system, an interface system to one or more peripheral devices and/or a connection and/or interface system to a computer system, an intranet, and/or the Internet.

The input system 440 may include any one of, some of, any combination of, or all of a keyboard system, a mouse system, a track ball system, a track pad system, one or more buttons on a handheld system, a scanner system, a microphone system, a connection to a sound system, and/or a connection and/or an interface system to a computer system, an intranet, and/or the Internet (i.e., IrDA, USB).

The memory system 450 may include any one of, some of, any combination of, or all of a long term storage system, such as a hard drive; a short term storage system, such as random access memory; or a removable storage system, such as a floppy drive or a removable drive and/or a flash memory. The memory system 450 may include one or more machine readable mediums that may store a variety of different types of information. The term machine readable medium may be utilized to refer to any medium capable of carrying information that may be readable by a machine. One example of a machine-readable medium may be a computer-readable medium such as a non-transitory storage media. The memory system 450 may store one or more machine instructions to digitally scan an object in three dimensions. The operating system 451 may control all software and hardware of the system 300. The network communications module 452 may enable the server system 304 to communicate on the communications network 312. The web browser module 453 may allow for browsing the Internet. The web server application 454 may serve any number of web pages to client systems that request the web pages, thereby facilitating browsing on the Internet.

The processor system 460 may include any one of, some of, any combination of, or all of multiple parallel processors, a single processor, a system of processors having one or more central processors and/or one or more specialized processors dedicated to specific tasks. The processor system 460 may implement the machine instructions stored in the memory system 450.

In an alternative embodiment, the communication interface 470 may allow the server system 304 to interface with the communications network 312. In this embodiment, the output system 430 may send communications to the communication interface 470. The communications system 475 communicatively links the output system 430, the input system 440, the memory system 450, the processor system 460 and/or the input/output system 480 to each other. The communications system 475 may include any one of, some of, any combination of, or all of one or more electrical cables, fiber optic cables, and/or sending signals through air or water (e.g. wireless communications), and the like. Some examples of sending signals through air and/or water may include systems for transmitting electromagnetic waves such as infrared and/or radio waves and/or systems for sending sound waves.

The input/output system 480 may include devices that have the dual function as the input and output devices. For example, the input/output system 480 may include one or more touch sensitive screens, which display an image and therefore may be an output device and accept input when the screens may be pressed by a finger or a stylus. The touch sensitive screens may be sensitive to heat and/or pressure. One or more of the input/output devices may be sensitive to a voltage or a current produced by a stylus. The input/output system 480 may be optional and may be utilized in addition to or in place of the output system 430 and/or the input device 440.

The following embodiments describe different configurations of the scanning system. Since the system 300 to digitally scan an object in three dimensions may be agnostic to the amount of data it receives and the sources from where it is received, the stage that gathers data is a completely independent module. This allows for different scanner configurations without changing the base of the system. Such configurations include an amount of sensors, type of sensors, and information known before scanning such as a precalculated scanner position to optionally assist the data merging module.

Figure 5:
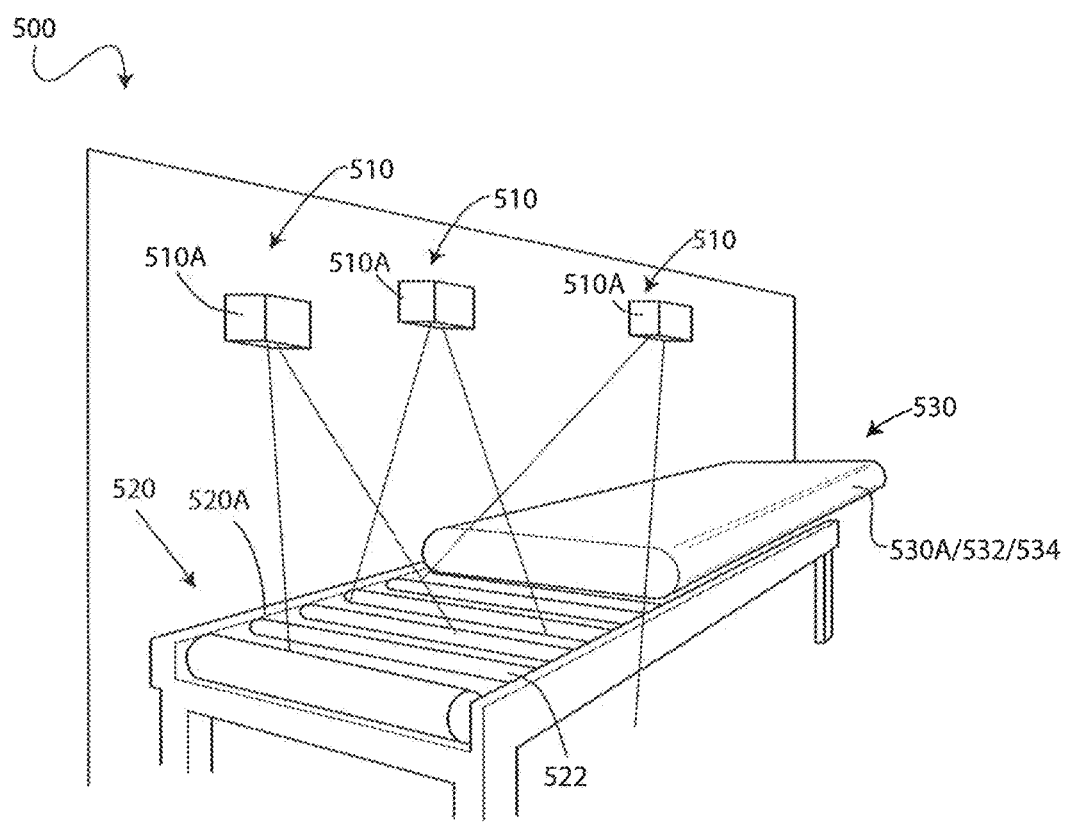
FIG. 5 illustrates an exemplary multiple scanner system.

FIG. 5 illustrates an exemplary multiple scanner system 500.

The multiple scanner system 500 may include any number of scanners 510, a scanning surface 520 and a scanned object 530.

The scanners 510 may be secured to a structure 512 such as a wall 512A, a ceiling (not shown) and the like. FIG. 5 illustrates the scanners 510 are secured to a wall 512A. The scanners 510 may also be secured to a floor 512B or the like. The scanners 510 may be a holographic scanner 510A and the like. The scanning surface 520 may be a conveyor belt 520A, a table (not shown) and the like. The conveyor belt 520A may be a moving conveyor belt (not shown) that moves the scanned object 530 to the scanners 510. The conveyor belt 520A may also have any number of rollers 522, any number of wheels (not shown) and the like that moves the scanned object 530 by pushing the scanned object 530 along the conveyor belt 520A towards the scanners 510. The scanned object 530 may be a piece of cargo 530A, a package (not shown), and the like. The scanners 510 may also be secured to the scanning surface 520 to surround the scanned object 530. The scanners 510 may not move during scanning and data from all of the scanners 510 may be combined to make a three-dimensional representation of the scanned object 530. The scanners 510 may scan a moving object 532 or a stationary object 534.

Figure 6:
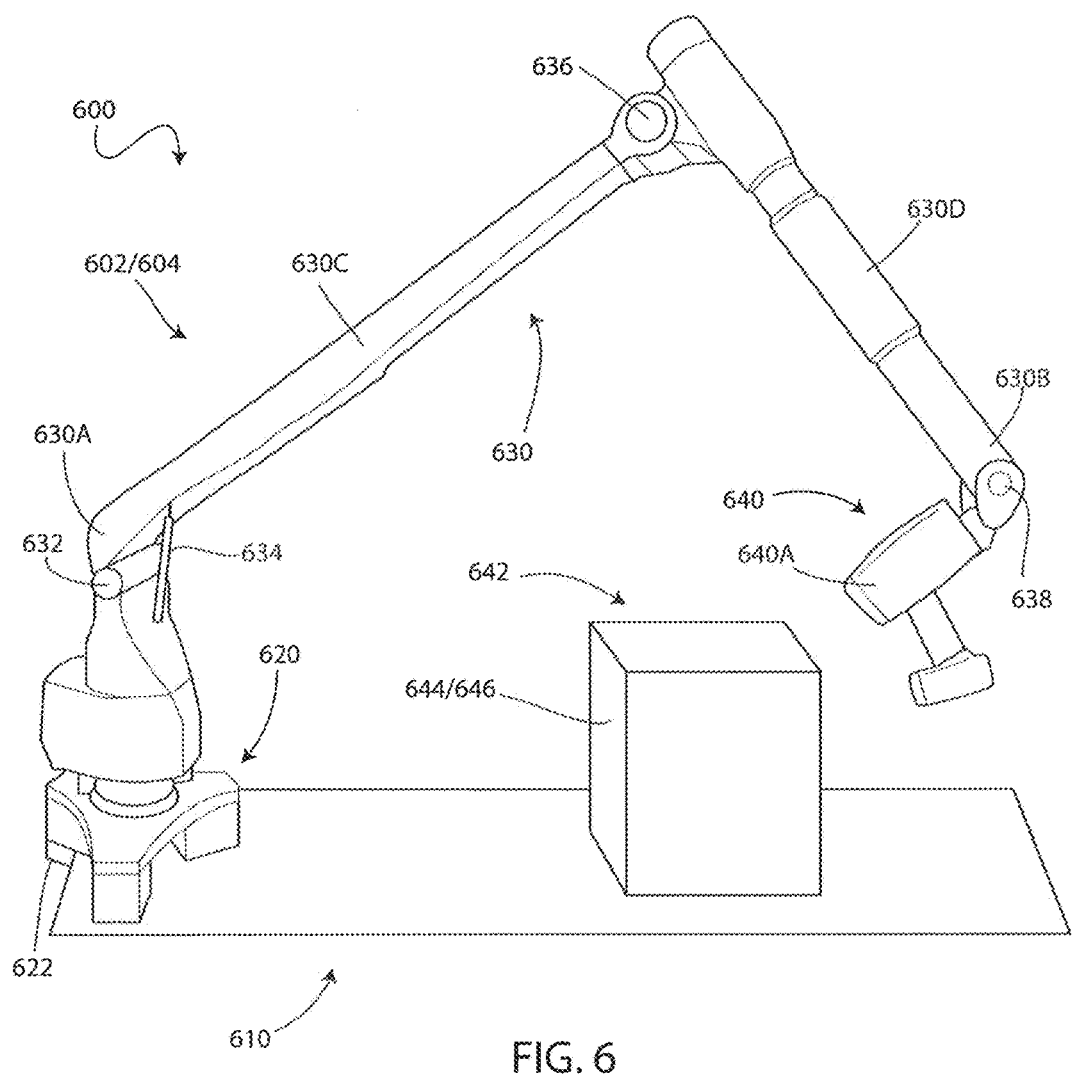
FIG. 6 illustrates an exemplary articulating scanner.

FIG. 6 illustrates an exemplary articulating scanner system 600. The articulating scanner system 600 may be an articulating arm scanner 602, an articulating platform scanner 604 and the like.

The articulating arm scanner 600 may include a scanning surface 610, an attachment device 620, an articulating arm 630 and a scanner 640.

The scanning surface 610 may be a table 610A and the like. The attachment device 620 may be coupled to the scanning surface 610 to secure the articulating arm scanner 600 while being utilized. The attachment device 620 may be a clamp 622 and the like. The articulating arm 630 may have a first end 630A, a second end 630B, a first portion 630C and a second portion 630D. The first end 630A of the articulating arm 630 may be coupled to the attachment device 620 by a first movable joint 632 that may allow a first portion 630C of the articulating arm 630 to move in any direction such as an up and down direction, a sideways direction, a circular direction and the like. The first end 630A of the articulating arm 630 may also be supported by a support 634 such as a pneumatic support 634A and the like. The second portion 630D of the articulating arm 630 may be coupled to the first portion 630C of the articulating arm 630 by a second movable joint 636 to move in any direction such as an up and down direction, a sideways direction, a circular direction and the like. The first portion 630C of the articulating arm 630 may move independently of the second portion 630D of the articulating arm 630. The scanner 640 may be coupled to the second end 630B of the articulating arm 630 by a third movable joint 638 to move in any direction such as an up and down direction, a sideways direction, a circular direction and the like. The scanner 640 may be a holographic scanner 640A and the like. The scanner 640 may make a three-dimensional representation of an object 642 being scanned. The scanner 640 may scan a moving object 644 or a stationary object 646. This embodiment has only one scanner 640 but may be relatively slower than other scanners because of the time required to move the one scanner 640 relative to the object 642.

In still another exemplary embodiment, an RBG/Depth camera may be mounted above the scanning surface 610 and can capture color images of an object along with 3D depth information. The color images can be saved for documentation purposes and the depth data may be used for dimensioning. In some further exemplary embodiments, no 3D model may be created in this embodiment but a picture can be produced. Bar codes may also be read using the same methodology.

Figure 7:
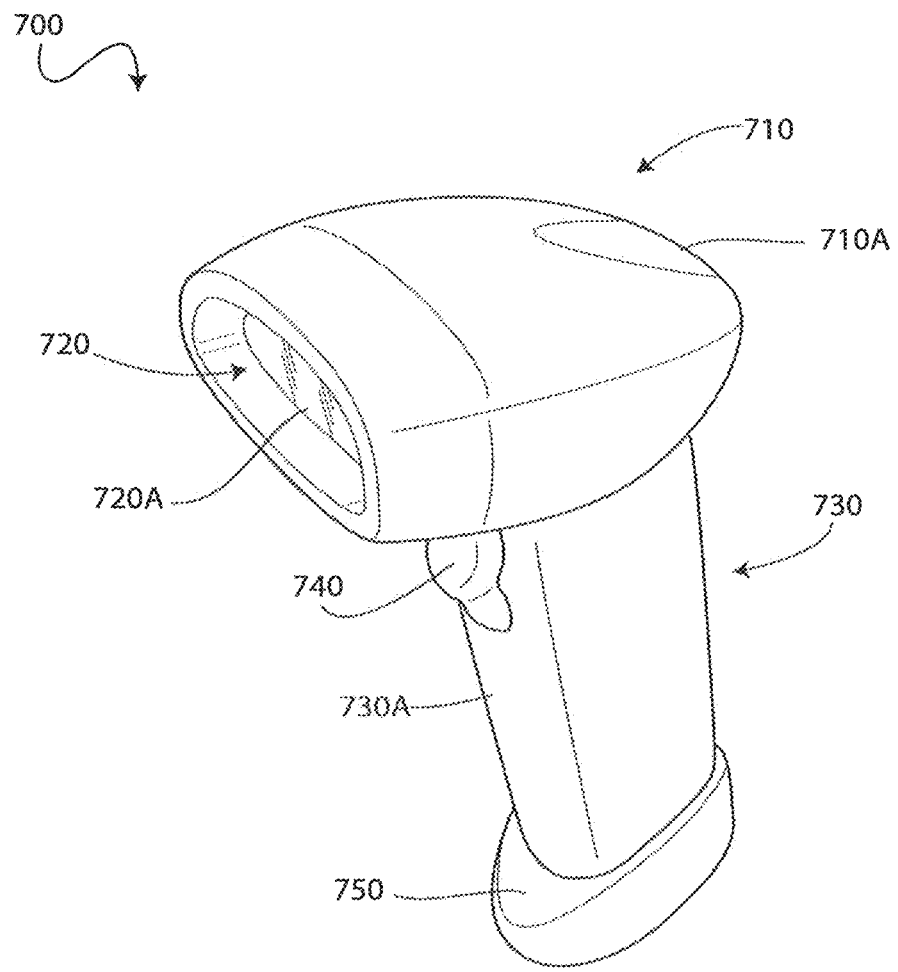
FIG. 7 illustrates an exemplary handheld scanner.

FIG. 7 illustrates an exemplary handheld scanner 700.

The handheld scanner 700 may include a casing 710, a scanner 720, a handle 730 and an activation button 740.

The casing 710 may be ergonomically designed to accommodate a user's hand to comfortably maneuver the handheld scanner 700. The casing 710 may accommodate any sized user's hand. The scanner 720 may be disposed on a top portion 710A of the casing 710 to scan an object (FIG. 6, 642) to obtain any number of object dimensions such as the length, width and height of the object 642 and the like. The scanner 720 may be a holographic scanner 720A and the like. The scanner 720 may make a three-dimensional representation of an object 642 being scanned. The scanner 720 may scan a moving object 644 or a stationary object 646. The handle 730 may extend downward from the scanner 720 and may be grasped by the user's hand to comfortably maneuver the handheld scanner 700 to scan any number of the objects 642 repeatedly with relatively less fatigue than a traditional non-ergonomic handheld scanner. The activation button 740 may be disposed on a top portion 730A of the handle 730 underneath the scanner 720. The activation button 740 may be depressed down to maintain a laser beam and the like to scan the object 642. The activation button 740 may also be supplemented with any number of control buttons (not shown) to control other scanning functions such as scanning intensity and the like. The casing 710 may also include a portable battery 750 to provide electrical power to the handheld scanner 700. The portable battery 750 may also be rechargeable and the like.

Figure 8:
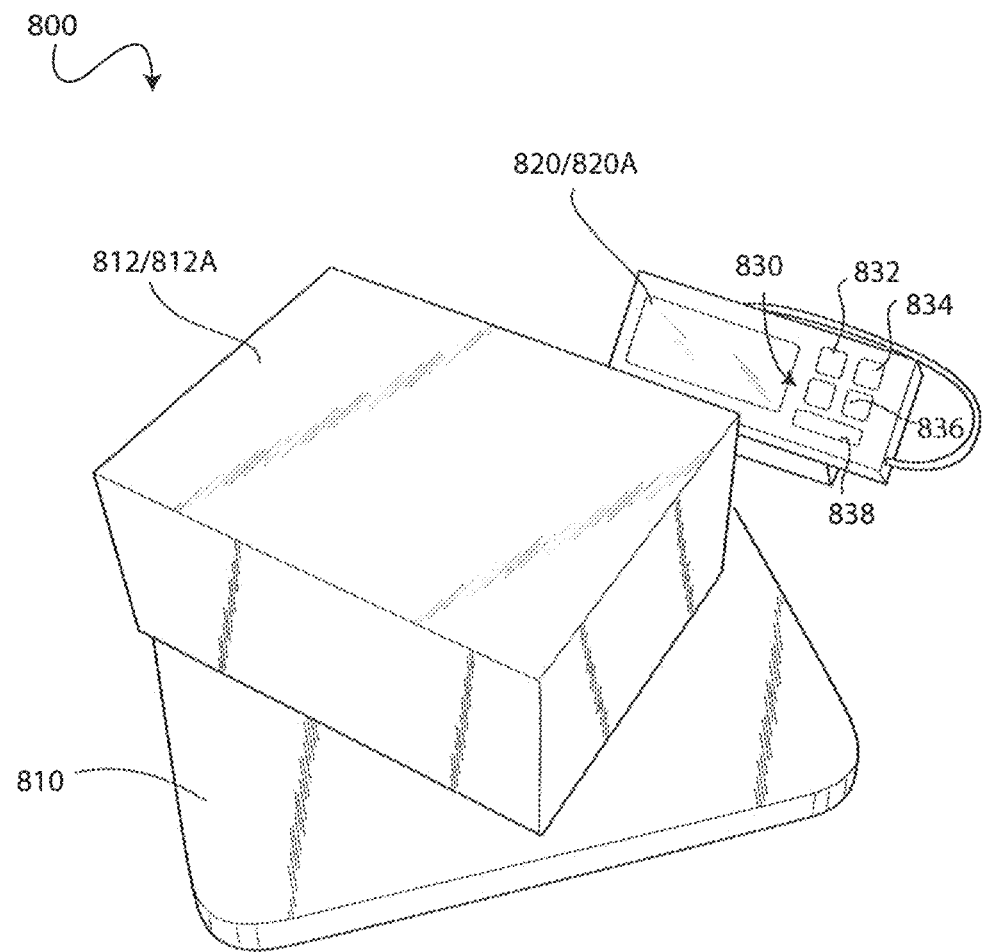
FIG. 8 illustrates an exemplary freight scale.

FIG. 8 illustrates an exemplary freight scale 800.

The freight scale 800 may include a digital scale 810 and a display 820.

The digital scale 810 may provide the weight of an object 812 such as a package 812A, a piece of cargo (not shown) and the like. The object 812 may be weighted after being scanned by the system to digitally scan an object in three dimensions (FIG. 3, 300). The dimensions of the object 812 may be utilized by users in addition to the weight of the object 812 to ship or transport the object 812. The display 820 may be a digital display 820A that may display the weight of the object and the like. The display 820 may include any number of buttons 830 that may include a start button 832, a clear button 834, a tare button 836, a shut-off button 838 and the like.

Figure 9:
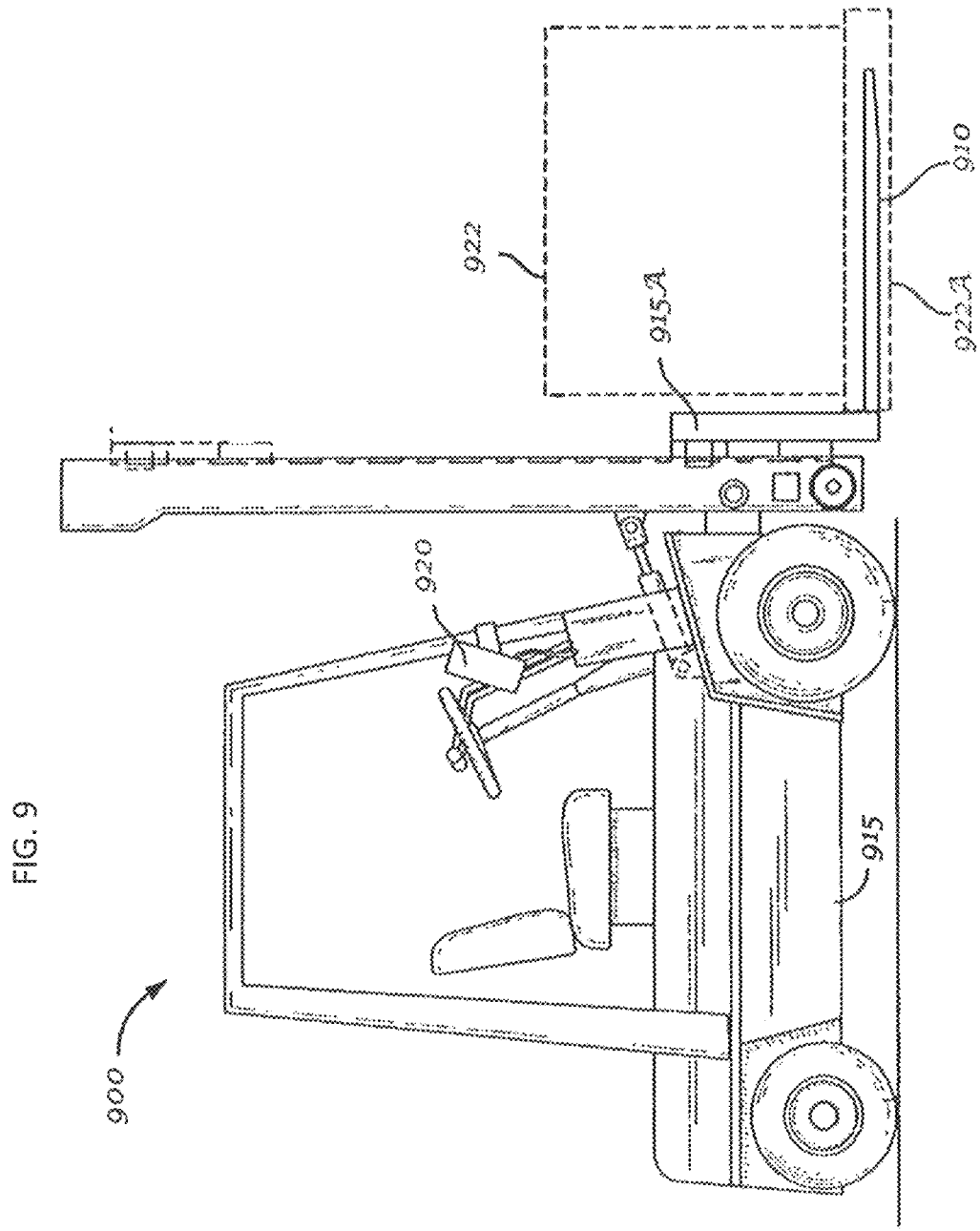
FIG. 9 illustrates an exemplary integrated forklift scale.

FIG. 9 illustrates an exemplary integrated forklift scale 900.

The integrated forklift scale 900 may include a scale 910 and a display 920. The scale 910 may be integrated into a forklift 915 and is typically integrated into a forklift carriage 915A, forklift tongs 910, or the like. The display 920 may be a digital display or the like. The display 920 may indicate the weight of an object 922, such as a pallet 922A, being transported by the forklift 915. The integrated forklift scale 900 may save time and money by weighing the object with a one-step operation without having to transport, weigh and remove the object on a scale (not shown).

Figure 10:
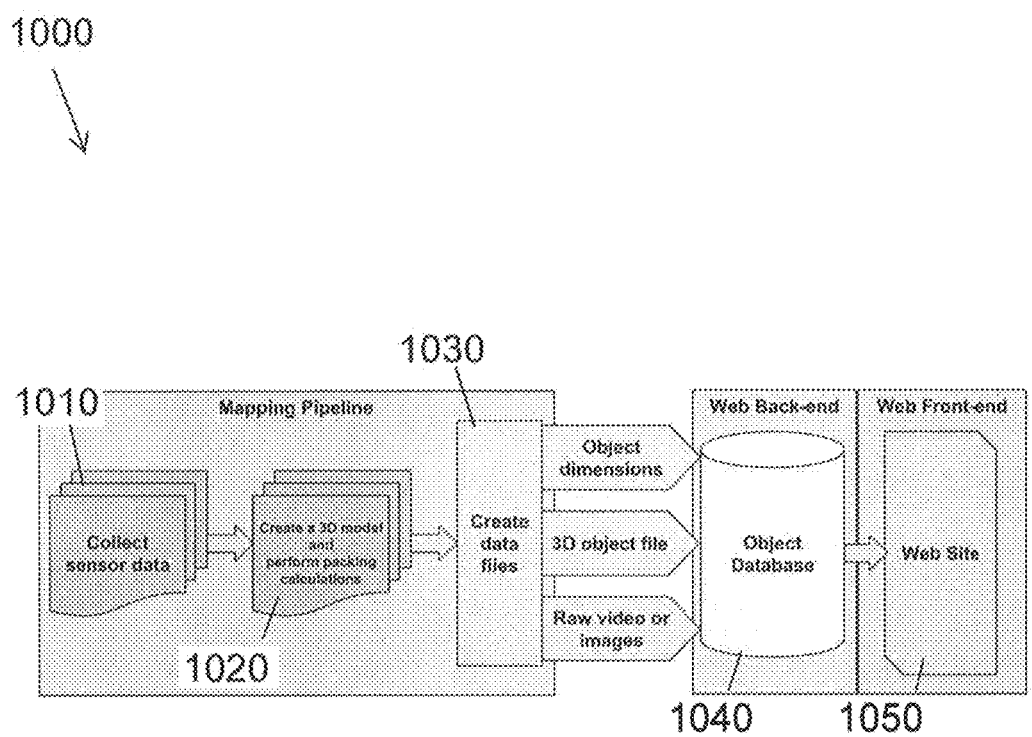
FIG. 10 illustrates an exemplary overall method for digitally scanning an object in three dimensions.

FIG. 10 illustrates an exemplary overall method for digitally scanning an object in three dimensions 1000.

The method for digitally scanning an object in three dimensions 1000 may include exemplary embodiments where the steps of collecting sensor data 1010, creating a three-dimensional model and performing any number of packing calculations 1020, creating any number of data files 1030, transmitting the created data files to an object database 1040 and transmitting the created data files to a website 1050.

The collecting step 1010 may include collecting scanned object data from a digital scanner and the like. The first creating step 1020 may include performing the packing calculations from the collected scanned object data. The second creating step 1030 may include creating data files from the collected sensor data. The created data files may include the object dimensions such as the length, the width and height of the object and the like, a three-dimensional object file and any number of raw video or any number of images of the object and the like. The first transmitting step 1040 may include transmitting the created data files from the scanner or the object database over the Internet, a local area network or LAN, a wide area network or WAN and the like. The object database or memory system may reside on the server system of the system digitally scan an object in three dimensions. The second transmitting step 1050 may include allowing a user access to the created data files on the object database from the website. The website may include any number of web pages that the user may access the created data files on the object database.

Figure 11:
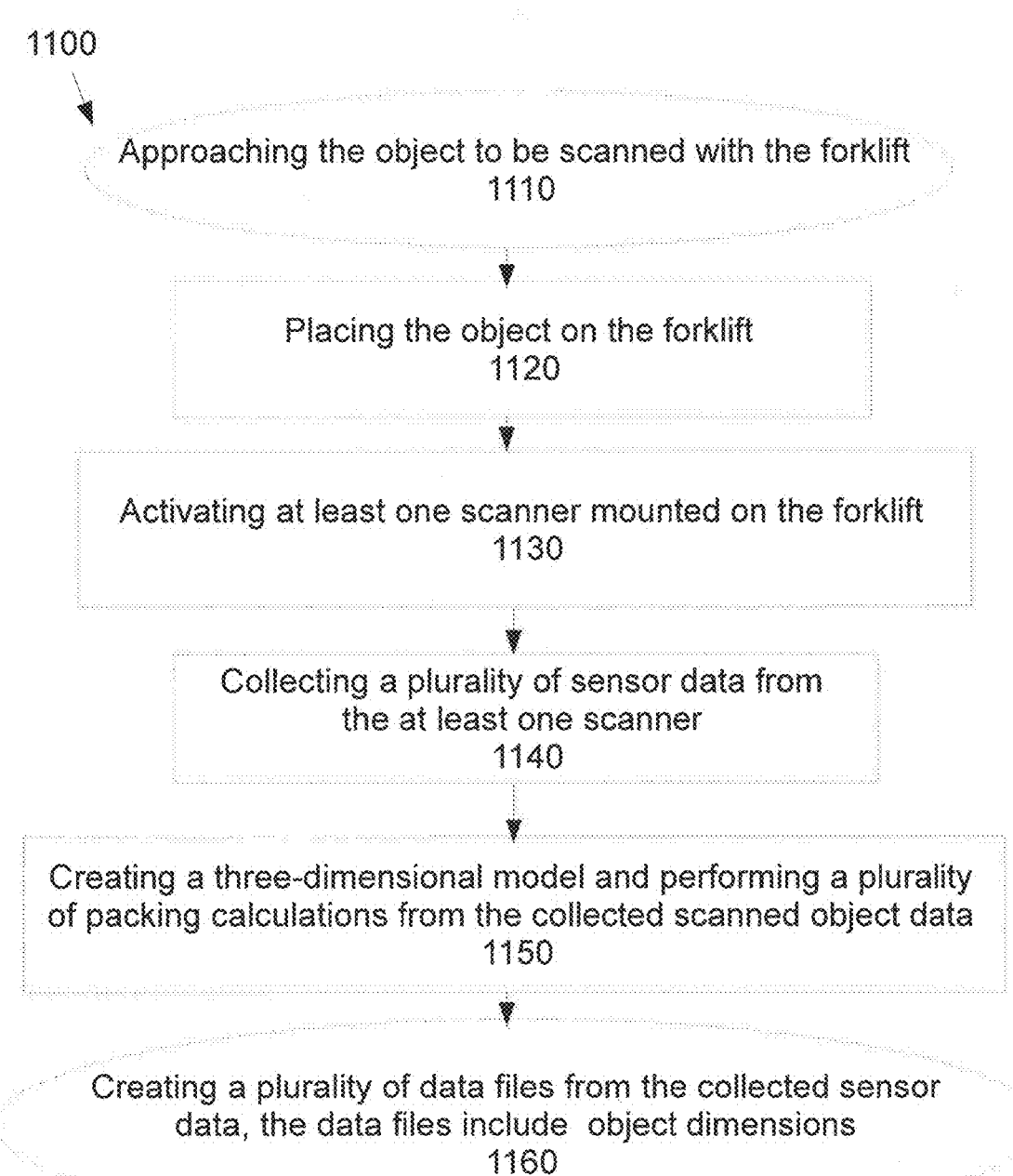
FIG. 11 illustrates an exemplary overall method for digitally scanning an object in three dimensions.

FIG. 11 illustrates an exemplary overall method for digitally scanning an object in three dimensions 1100.

The method 1100 may include the steps of approaching the object to be scanned with the forklift 1110, placing the object on the forklift 1120, activating at least one scanner mounted on the forklift 1130, collecting a plurality of sensor data from the at least one scanner 1140, creating a three-dimensional model and performing a plurality of packing calculations from the collected scanned object data 1150, and creating a plurality of data files from the collected sensor data, the data files include object dimensions 1160.

The approaching step 1110 may include the forklift having a pair of tongs or arms. The placing step 1120 may include a pallet under the object to accommodate the pair of tongs to be placed under the pallet. The activating step 1130 may include activating the scanner when the object is on the forklift. The collecting step 1140 may include collecting digital sensor data. The first creating step 1150 may include storing the collected scanned object data on a database or a memory system. The second creating step 1160 may include the object dimensions such as length, width and height of the object.

The foregoing description and accompanying figures illustrate the principles, embodiments and modes of operation of the present invention. However, the present invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments may be made by those skilled in the art without departing from the scope of the present invention as defined by the following claims.

What is claimed is:

1. A system to digitally scan an object in three dimensions, comprising:
a server system with a processor system, a communications interface, a communications system, an input system and an output system, the server system having access to a communications network;
a memory system with an operating system, a communications module, a web browser module, a web server application and a digitally scan an object in three dimensions non-transitory storage media;
a scanner, the scanner comprising a depth camera, the scanner configured to scan and dimension an object and transfer a plurality of scanner data to the memory system, wherein the scanner is in a precalculated scanner position above a scanning surface, the scanner data resides on the digitally scan an object in three dimensions non-transitory storage media and includes a plurality of object dimensions such as length, width and height of the object, a three-dimensional object file and a plurality of raw video or a plurality of images of the object; and
a freight scale that weighs the object and transfers weight information of the object to the memory system, the freight scale comprising an integrated forklift scale, wherein the freight scale is configured to weigh the object in a one-step operation;
wherein the server system performs a plurality of packing calculations from the collected scanned object data and the weight information; and
wherein the transfer of the plurality of scanner data to the memory system is preceded by a step of dimensioning the object and storing a dimensioning result as scanner data, the dimensioning result comprising depth data of the object.

2. The system according to claim 1, further comprising a website having a plurality of web pages, the web pages having access to the digitally scan an object in three dimensions non-transitory storage media.

3. The system according to claim 1, further comprising a client system having an output system, an input system, a memory system, a processor system and a communications system.

4. The system according to claim 1, wherein a client system accesses the server system via the communications network.

5. The system according to claim 1, wherein the client system is selected from the group consisting of a personal computer, a laptop computer, a tablet computer, a computerized watch, an optical head-mounted display or a cell phone with an operating system.

6. The system according to claim 1, wherein the communications network is selected from the group consisting of a wide area network, a local area network or the Internet; and wherein the server system is configured to, once the server system has completed packing calculations, create one or more data files based on the plurality of packing calculations, and wherein the server system is configured to host and control access to the one or more data files, such that the one or more data files on an object database of the server system can be accessed by a client system.

7. The system according to claim 1, wherein the object in three dimensions non-transitory storage media is a software application.

8. The system according to claim 1, wherein the scanner is a multiple scanner system having a plurality of scanners, a scanning surface and an object.

9. The system according to claim 1, wherein the scanner is an articulating arm scanner.

10. The system according to claim 1, wherein the scanner is an articulating platform scanner.

11. The system according to claim 1, wherein the scanner is a handheld scanner.

12. The system according to claim 1, wherein the scanner is mounted on a forklift.

13. A method for digitally scanning an object in three dimensions, comprising the steps of:
   collecting a plurality of sensor data of an object to be scanned from a digital scanner, the scanner comprising a depth camera, the step of collecting a plurality of sensor data of an object to be scanned comprising collecting at least depth data;
   creating a three-dimensional model and obtaining weight information of the object from an integrated forklift scale configured to weigh the object in a one-step operation;
   performing a plurality of packing calculations from the collected scanned object data and the weight information;
   creating a plurality of data files from the collected sensor data and the weight information, the data files include object dimensions such as length, width and height of the object;
   transmitting the created data files to an object database of a server system; and
   transmitting the created data files to a website, the transmitting includes allowing a user access to the created data files on the object database from the website.

14. The method according to claim 13, wherein the data files from the collected sensor data include a three-dimensional object file.

15. The method according to claim 13, wherein the data files from the collected sensor data include a plurality of raw video or a plurality of images of the object.

16. The method according to claim 13, wherein the transmitting the created data files to a website step includes transmitting the created data files from the digital scanner or the object database over the Internet, a local area network, or a wide area network.

17. The method according to claim 13, wherein the website includes a plurality of web pages that the user accesses the created data files on the object database.

18. A non-transitory computer storage media having instructions stored thereon which, when executed, execute a method for digitally scanning an object in three dimensions, comprising the steps of:
   collecting a plurality of sensor data of the object from a digital scanner, the digital scanner comprising a depth camera;
   creating a three-dimensional model and obtaining weight information of the object from an integrated forklift scale configured to weigh the object in a one-step operation;
   performing a plurality of packing calculations from the collected scanned object data and the weight information;
   creating a plurality of data files from the collected sensor data and the weight information, the data files include object dimensions such as length, width and height of the object;
   transmitting the created data files to an object database of a server system; and
   transmitting the created data files to a website, the transmitting includes allowing a user access to the created data files on the object database from the website.

* * * * *